(12) United States Patent
Dove et al.

(10) Patent No.: US 6,933,020 B2
(45) Date of Patent: Aug. 23, 2005

(54) HOT MELT COATING COMPOSITION FOR FILM TRANSFER AND CASTING PROCESS

(75) Inventors: Clive Nicholas Dove, Blackburn (GB); John Sutcliffe, Todmorden (GB); Ann Kerstin Birgitta Kjelqvist Lindell, Malmö (SE)

(73) Assignee: Akzo Nobel N.V., Arnhem (NL)

( * ) Notice: Subject to any disclaimer, the term of this patent is extended or adjusted under 35 U.S.C. 154(b) by 258 days.

(21) Appl. No.: 10/382,418

(22) Filed: Mar. 6, 2003

(65) Prior Publication Data

US 2004/0028834 A1 Feb. 12, 2004

Related U.S. Application Data

(60) Provisional application No. 60/372,233, filed on Apr. 12, 2002.

(30) Foreign Application Priority Data

Mar. 6, 2002 (EP) .............................................. 02251552

(51) Int. Cl.⁷ .................................................. C08F 2/48
(52) U.S. Cl. ...................... 427/508; 427/355; 427/369; 427/370; 427/375; 427/379; 427/385.5; 427/487; 427/595
(58) Field of Search ................................ 427/487, 508, 427/595, 355, 369, 370, 375, 379, 385.5

(56) References Cited

U.S. PATENT DOCUMENTS

| 4,107,391 A | 8/1978 | Moore et al. ............... 428/483 |
| 4,113,894 A | 9/1978 | Koch, II ....................... 427/44 |
| 4,388,137 A | 6/1983 | McCarty et al. .......... 156/275.5 |
| 5,037,668 A | 8/1991 | Nagy ........................... 427/44 |
| 5,773,126 A | 6/1998 | Noritake et al. ............ 428/143 |
| 6,340,719 B1 * | 1/2002 | Goeb et al. ................. 522/174 |

FOREIGN PATENT DOCUMENTS

| DE | 44 21 559 A1 | 12/1995 | ............ B05D/5/06 |
| DE | 197 06 619 A1 | 5/1998 | ............ B05D/7/02 |
| GB | 2 053 028 A | 2/1981 | ............ B05D/3/00 |
| WO | WO 80/01472 | 7/1980 | ............ B05D/3/00 |
| WO | WO 90/15673 | 12/1990 | ............ B05D/3/12 |

* cited by examiner

Primary Examiner—Bernard Pianalto
(74) Attorney, Agent, or Firm—Lainie E. Parker

(57) ABSTRACT

A coating composition that can be used in a process for coating a substrate where in a first step a radiation curable coating composition is applied to the substrate and/or a radiation permeable film. Next, the substrate and the film are pressed together in such a way that the coating composition is sandwiched between them. Thereafter, the coating composition is cured by irradiation through the film to obtain a coated substrate. In a subsequent step, the film is removed from the coated substrate. The coating composition applied to the film and/or the substrate is a hot melt composition comprising 20 to 100 wt. % of a radiation curable resin or mixture of radiation curable resins having a viscosity in the range of from 15 to 10,000 mPa.s in the temperature range of from 40 to 150° C.

12 Claims, No Drawings ated into the final film. However, they are known for their
HOT MELT COATING COMPOSITION FOR FILM TRANSFER AND CASTING PROCESS This application claims the benefit of European Patent Application No. 02251552.2, filed Mar. 6, 2002, and U.S. Provisional Patent Application No. 60/372,233, filed Apr. 12, 2002.

FIELD OF THE INVENTION

The present invention relates to a coating composition that can be used in a process for coating a substrate where in a first step a radiation curable coating is applied to the substrate and/or a radiation permeable film, next the substrate and the film are pressed together in such a way that the coating is sandwiched between them, thereafter the coating is cured by irradiation through the film to obtain a coated substrate, and in a subsequent step the film is removed from the coated substrate.

BACKGROUND OF THE INVENTION

An example of such a process is described in U.S. Pat. No. 4,388,137. This patent publication discloses a process in which a coating composition is applied to a film before the film and a substrate are pressed together. Next, the coating composition is cured, followed by the film being stripped from the coated substrate. Such a process, in which a coating layer is transferred from a film to a substrate, is sometimes referred to as a film transfer process.

This US publication offers some general information regarding the selection of the coating compositions to be used in the process. Coating compositions without volatile organic compounds, or with only a low level of volatile organic compounds, are not mentioned.

During the drying and curing of coating compositions that contain volatile organic compounds, the main portion of these volatile organic compounds is emitted. Further, when total conversion of the components is not obtained, for instance in the case of UV cure, the uncured low-molecular weight organic molecules can cause environmental problems when the substrate is cut or sanded. Given present day environmental concerns and the corresponding legislation, there is a need for coating compositions without volatile organic compounds or with only a low level of volatile organic compounds.

In U.S. Pat. No. 4,113,894 a process is disclosed in which a substrate is coated with a radiation curable coating composition before a film is placed over the substrate. The substrate and film are irradiated together to cure the coating, after which the film is peeled from the substrate. In the current application, this type of coating process will be referred to as a casting process.

This US publication also does not mention coating compositions with a low level of volatile organic compounds or no volatile organic compounds at all.

In WO 80/01472 a process is disclosed in which a film is coated with a radiation curable coating composition, optionally followed by heating the coated film to evaporate non-polymerisable solvents from the coating. Subsequently, the coated film is applied to a substrate. The coating sandwiched between the film and the substrate is cured by UV radiation, after which the film is removed from the coated substrate. The coating compositions used in this process comprise a high level of organic solvent and/or high level of reactive diluent, i.e. monomers that take part in the curing reaction.

A drawback of this method is that organic solvents may have to be evaporated, while the VOC level is restricted by present day legislation. Such restrictions are expected to be tightened in the near future. Several recycling systems for solvents have been proposed, but such systems and their operation are capital intensive. The use of reactive diluents reduces or eliminates VOC emission, as they are incorporated into the final film. However, they are known for their skin irritant and sensitising properties. Further, these components often have a strong or unpleasant odour and are suspect in view of their toxic properties.

A further problem when coating porous substrates e.g. wood, with compositions comprising reactive diluents is the penetration of the reactive monomers into the pores of the substrate. This is a drawback in particular when the coating is cured by radiation. Since the radiation does not reach these areas, uncured coating material in the pores of the substrate is the result. This can give health, safety, and environmental problems, e.g., when the substrate is cut or sanded. Release of free monomers from porous panels is known to occur even years after the lacquer has been applied.

Well-known acrylic diluents, e.g., tripropylene glycol diacrylate (TPGDA), hexanediol diacrylate (HDDA), acrylated pentaerythritolethoxylate (PPTTA), and hydroxyethyl methacrylate (HEMA) are skin irritants and sensitising and will never react if they are not reached by the UV light.

The use of a process for coating a substrate where the coating composition is sandwiched between the substrate and a radiation permeable film and subsequently cured has several advantages over processes where such a film is absent. A major advantage lies in the fact that the surface configuration on the side of the film facing the coating layer can be imparted to the cured coating. This enables the manufacture of coated substrates with, in principle, any decorative effect. For example, it is possible to make a high gloss coated substrate by using a high gloss film. Low gloss substrates can be manufactured by using low gloss films, which has the advantage that it is not necessary to add a matting agent to the coating composition. It is also possible to manufacture textured coated substrates, for example substrates with a leather- or wood-like structure surface. Since the radiation curable coating is cured in the absence of oxygen, a more durable cured coating with improved (mechanical) properties is obtained.

SUMMARY OF THE INVENTION

The present invention relates to a process for coating a substrate where in a first step a radiation curable coating is applied to the substrate and/or a transparent film, Next, the substrate and the film are pressed together in such a way that the coating is sandwiched between them. Thereafter, the coating is cured by irradiation through the film to obtain a coated substrate. In a subsequent step, the transparent film is removed from the coated substrate. The coating is a hot melt coating composition, which gives very good results when used in any of the above-mentioned processes. For example, this coating shows a good release of the film from the coated substrate after curing of the coating composition. Further, the coating composition can be used on a wide variety of substrates and in combination with a wide variety of films.

In the process according to the present invention, the coating composition applied to the film and/or the substrate is a hot melt composition comprising 20 to 100 wt. % of a radiation curable resin or mixture of radiation curable resins having a viscosity in the range of from 15 to 10,000 mPa·s in the temperature range of from 40 to 150° C.

DETAILED DESCRIPTION OF THE INVENTION

In view of present day environmental concerns, the use of a hot melt composition is preferred, as these comprise a low level of volatile organic compounds or no volatile organic compounds at all. Additionally, the hot melt composition comprises a low level of reactive diluent or no reactive diluent at all.

In a film transfer process or a casting process, the use of a hot melt composition that emits substantially no volatiles during drying, cooling or curing has an additional advantage in that the coating does not have to be dried after application. Consequently, after applying the coating to the film and/or the substrate, the film and the substrate can be pressed together (almost) directly. This is advantageous because it implies lower energy costs and a reduced processing time.

Normally amines, such as triethanolamine, or acrylated amines are added to UV curable hot melt coating compositions. These amines can act as a synergist for the curing reaction. Sometimes amines are added when a high gloss surface needs to be obtained as amines increase the surface curing. A disadvantage of amines is, however, that they cause yellowing.

It was now found that an additional advantage of the current process is that a high gloss coating can be prepared using less or even no amines. Preferably, the hot melt composition comprises less than 3 wt. %, more preferably less than 2 wt. %, even more preferably less than 1 wt. % of such amines, based on the total weight of the uncured hot melt composition.

Other advantages of the present invention, which will be elaborated on below, are that the process is very suitable to coat porous substrates, it requires a relatively small amount of photoinitiators, a relatively high amount of pigments can be present in the coating composition, the uncured coating composition can be allowed to reflow after application, the process can be performed at high speed when the coating does not have to be cured, and it is possible to coat two opposite sides of the substrate at the same time.

The hot melt composition used in the process according to the present invention is radiation curable. Within the framework of the present invention, a radiation curable coating composition is a coating composition which is cured by using electromagnetic radiation having a wavelength $\lambda \leq 500$ nm or electron beam radiation. An example of electromagnetic radiation having a wavelength $\lambda \leq 500$ nm is UV radiation. Radiation sources which may be used are those customary for electron beam and UV. For example, UV sources such as high-, medium-, and low-pressure mercury lamps may be used. Also, for instance, gallium and other doped lamps may be used, especially for pigmented coatings. It is also possible to cure the hot melt composition by means of short light pulses.

In one embodiment of the present invention, especially when curing clear coats, the hot melt composition is cured using low energy UV sources, i.e. by so-called daylight cure. The intensity of these lamps is lower than that of the aforementioned UV sources. Low energy UV sources hardly emit UV C; they predominantly emit UV A, and radiation with a wavelength at the border of UV B and UV A. Preferably the hot melt composition is cured by radiation having a wavelength of 300 nm $\leq \lambda \leq$ 500 nm, more preferably 300 nm $\leq \lambda \leq$ 450 nm. For some compositions low energy UV sources emitting radiation having a wavelength of 370 nm $\leq \lambda \leq$ 450 nm can be preferred. Commercially available daylight cure lamps are for instance, solarium-type lamps, and specific fluorescent lamps such as TL03, TL05 or TL09 lamps (ex Philips) and BLB UV lamps (ex CLE Design).

The coating sandwiched between the substrate and the radiation permeable film is cured by irradiation through the film. If the coating is cured by electron beam, the film material is not critical, since penetration by the electrons can be assured by selecting a sufficiently high voltage. Consequently, in the case of cure by electron beam, the film can comprise, e.g., aluminium foil or an aluminised layer, for instance an aluminised polyester film, plastic or paper. If the coating is cured by UV radiation, the film has to be sufficiently transparent to the UV radiation for the coating to be cured. Consequently, in the case of cure by UV radiation, the film can comprise quartz glass or glass plate or a polymeric material, for example polyvinyl chloride, acetate, polyethylene, polyester, an acrylic polymer, polyethylene naphthalate, polyethylene terephthalate or polycarbonate. The film can be rigid or flexible, and may be of any desired thickness, as long as it permits sufficient transmission of the radiation to result in a sufficient cure of the coating composition.

Ideally, a coating is chosen that shows good release properties from the transfer or casting film. When there is good film release, the film can be removed from the coated substrate with the coating remaining virtually undamaged. The hot melt compositions used in a process according to the present invention are suitable to be combined with a wide range of film types, including untreated films.

In order to ensure good release properties from the transfer or casting film, the film may be treated. The type of film treatment used should be adjusted to the type of film and to the type of coating that is transferred or cast in the process according to the present invention. The film can for instance be coated with a release coating. Such a release coating may contain silicone or a fluoropolymer such as polytetrafluoroethylene as release agent. U.S. Pat. No. 5,037,668 for instance, describes a silicone-free fluoropolymer comprising an acrylate-type release coating.

It was found that the hot melt composition used in the process according to the present invention is suited to be used on a wide variety of films and substrates. For instance, it can be applied to glass, ceramics such as ceramic tiles, and metals such as metal sheet, metal coil, and precoated metal sheets, for instance polyester precoated metal sheets. In particular, it can be used on heat-sensitive films and substrates, since it can be applied at relatively low temperatures. These films include cellulose-containing and plastic films. Examples of heat-sensitive substrates are wooden panels, veneer, fibreboards, paper, plastic parts, PVC, for instance PVC flooring, polyolefin flooring, linoleum flooring, electric circuit boards, and furniture foils which can be of paper, plastics, or others, e.g., linoleum.

As the coating composition comprises only a small amount of monomers which may penetrate into a porous substrate, and that may thus remain uncured, the process is very suitable to coat porous substrates. It is most advantageous to use a film transfer process when a porous substrate needs to be coated. The film, which preferably is nonporous, is coated and optionally cooled and/or dried, after which the coating is transferred to the porous substrate. Using this procedure, the amount of coating material required for coating the substrate is reduced, since less uncured coating material penetrates into the pores. Likewise, a minimum amount of coating material serves to prepare a smooth coating surface on a porous substrate when using a film with a smooth surface configuration on the side facing the substrate.

Normally, the application temperature of the hot melt coating composition used in the current invention is in the range of from 40 to 150° C. The preferred temperature range for applying the hot melt coating composition to heat-sensitive substrates or films is from 40 to 100° C., more preferably from 50 to 90° C. In a process according to the present invention, preference is given to the use of hot melt compositions that have a viscosity in the range of from 15 to 10,000 mPa·s at the application temperature (40 to 150° C.). Optimum coating properties are obtained if the viscosity of the composition is in the range of from 15 to 4,000 mPa·s, more preferably from 15 to 3,000 mPa·s, in the above-indicated application temperature ranges. The viscosity of the composition at the application temperature should be selected in accordance with the way the composition is applied to the film and/or the substrate. For example, for spray application the viscosity should be lower than for roller application.

It was found that by using these hot melt compositions excellent flow and levelling of the coating material are obtained. Further, it was found that the thickness of the coated film is easy to control. A coating film with a thickness of 5 μm can be applied without any special precautions being taken. On the other hand, it is also possible to apply a film with a thickness of 250 μm in one layer without sagging and with optimum levelling properties.

In principle, any radiation curable resin or mixtures of resins can be used in the hot melt composition used in the process according to the present invention, as long as the viscosity of the hot melt composition is or can be adjusted to a range of from 15 to 10,000 mPa·s in the temperature range of from 40 to 150° C. These resins are present in an amount of 20 to 100 wt. % of the composition. Preferably, the resin is present in an amount of 30 to 90 wt. %, more preferred is an amount of 40 to 90 wt. %.

Polyester acrylate resins were found to be very suitable for use in the hot melt coating composition in the process according to the present invention. Examples of suitable commercially available polyester acrylate resins are: Craynor® UVP-215, Craynor® UVP-220 (both ex Cray Valley), Genomere® 3302, Genomer® 3316 (both ex Rahn), Laromer® PE 44F (ex BASF), Ebecryl® 800, Ebecryl® 810 (both ex UCB), Viaktin® 5979, Viaktine® VTE 5969, and Viaktine® 6164 (100%) (all ex Vianova). Very promising results were found if the composition comprises at least 40 wt. % of a polyester acrylate resin.

Epoxy acrylate resins can also be used in the hot melt coating composition in the process according to the present invention. Examples of commercially available epoxy acrylate resins are: Craynor® UVE-107 (100%), Craynor® UVE-130, Craynor® UVE-151, CN® 104 (all ex Cray Valley), Photocryl® 201 (ex PC resins), Genomer® 2254, Genomer® 2258, Genomer® 2260, Genomer® 2263 (all ex Rahn), UVP® 6000 (ex Polymer technologies), and Ebecryl® 3500 (ex UCB).

Polyether acrylate resins can also be used in the hot melt coating composition in the process according to the present invention. Examples of commercially available polyether acrylate resins are: Genomer® 3456 (ex Rahn), Laromer® PO33F (ex BASF), Viaktin® 5968, Viaktin® 5978, and Viaktin® VTE 6154 (all ex Vianova). Urethane acrylate resins can also be used in the hot melt coating composition in the process according to the present invention. Examples of commercially available urethane acrylate resins are: CN® 934, CN® 976, CN® 981 (all ex Cray Valley), Ebecryl® 210, Ebecryl® 2000, Ebecryl® 8800 (all ex UCB), Genomer® 4258, Genomer® 4652, and Genomer® 4675 (all ex Rahn).

Other examples of radiation curable resins that can be used in the hot melt composition in the process according to the present invention are cationic UV curable resins, for instance cycloaliphatic epoxide resins such as Uvacure® 1500, Uvacure® 1501, Uvacure® 1502, Uvacure® 1530, Uvacure® 1531, Uvacure® 1532, Uvacure® 1533, and Uvacure® 1534 (all ex UCB Chemicals), Cyracure® UVR-6100, Cyracure® UVR-6105, Cyracure® UVR-6110, and Cyracure® UVR-6128, (all ex Union Carbide), or SarCate® K126 (ex Sartomer), acrylate modified cycloaliphatic epoxides, caprolactone based resins such as SR® 495 (=caprolactone acrylate, ex Sartomer), Tone® 0201, Tone® 0301, Tone® 0305, Tone® 0310, (all caprolactone triols, ex Union Carbide), aliphatic urethane divinyl ether, aromatic vinyl ether oligomer, bis-maleimide, diglycidyl ether of bisphenol A or other glycols, hydroxy-functional acrylic monomer, hydroxy-functional epoxide resin, epoxidised linseed oil, epoxidised polybutadiene, glycidyl ester or partially acrylated bisphenol A epoxy resin, or trimethylol propane oxetane (UVR® 6000, ex Union Carbide).

Other radiation curable compounds that are suitable to be used in the hot melt-containing composition in the process according to the present invention are, e.g., vinyl ether-containing compounds, unsaturated polyester resins, acrylated polyetherpolyol compounds, (meth)acrylated epoxidised oils, (meth)acrylated hyperbranched polyesters, silicon acrylates, maleimide functional compounds, unsaturated imide resins, compounds suitable for use in photo-induced cationic curing, or mixtures thereof.

In the radiation curable coating composition also use may be made of a radiation curable mixture of (a) photo-induced radical curing resin(s) and (b) photo-induced cationic curing resin(s). Such systems are sometimes called hybrid systems and may comprise, for example, acrylic oligomers as photo-induced radical curing resins, vinyl ethers as photo-induced cationic curing resins, and radical and cationic photoinitiators. In principle, all possible combinations of photo-induced radical curing resins and photo-induced cationic curing resins can be used in such hybrid systems.

Also non-radiation curable polymers can be incorporated into the hot melt composition. These polymers may be used to modify the viscosity, tack, adhesion, or film forming properties of the hot melt formulation and/or to modify the general film properties of the cured coating, such as stain resistance, flexibility or adhesion. Examples are Cellulose Acetate Butyrate (various grades, ex Eastman), Laropal materials, (ex BASF), Paraloid materials, (ex Rohm and Haas), and Ucar materials (ex Union Carbide). In general, the hot melt coating composition used in the process according to the present invention comprises 0 to 50 wt. % non-radiation curable polymers, preferably 0 to 35 wt. %, most preferably 10 to 20 wt. % non-radiation curable polymers.

Further, the composition can comprise a photoinitiator or a mixture of photoinitiators. Examples of suitable photoinitiators that can be used in the radiation curable composition according to the present invention are benzoin, benzoin ethers, benzilketals, α,α-dialkoxyacetophenones, α-hydroxyalkylphenones, α-aminoalkylphenones, acylphosphine oxides, benzophenone, thioxanthones, 1,2-diketones, and mixtures thereof. It is also possible to use copolymerisable bimolecular photoinitiators or maleimide-functional compounds. Co-initiators such as amine based co-initiators can also be present in the radiation curable coating composition. Examples of suitable commercially available photoinitiators are: Esacure® KIP 100F and Esacure® KIP 150 (both ex Lamberti), Genocure® BDK, Genocure® CQ, Genocure® CQ SE, Genocure® EHA, Velsicure® BTF, Quantacure® BMS, Quantacure® EPD (all ex Rahn), Speedcure® EDB, Speedcure® ITX, Speedcure® BKL, Speedcure® BMDS, Speedcure® PBZ, Speedcure® BEDB, Speedcure® DETX (all ex Lambson), Cyracure® UVI-6990, Cyracure® UVI-6974, Cyracure® UVI-6976, Cyracure® UVI-6992 (all ex Union Carbide), CGI-901, Irgacure® 184, Irgacure® 369, Irgacure® 500, Irgacure® 819, Darocur® 1000, Darocur® 1173 (all ex Ciba Chemicals), and Lucirin® TPO (ex BASF).

However, the presence of a photoinitiator is not necessary. In general, when electron beam radiation is used to cure the composition, it is not necessary to add a photoinitiator. When UV radiation is used, in general a photoinitiator is added. Although the total amount of photoinitiator in the composition is not critical, it should be sufficient to achieve acceptable curing of the coating when it is irradiated. However, the amount should not be so large that it affects the properties of the cured composition in a negative way. In general, the composition should comprise between 0 and 10 wt. % of photoinitiator, calculated on the total weight of the composition. As a rule, compared to the amount necessary when the coating is applied to a substrate and subsequently cured, in the process according to the present invention a smaller amount of photoinitiator can be used to achieve acceptable curing. This effect might be due to the film on top of the coating preventing the initiated radicals from being caught by oxygen in the air.

The composition can also contain one or more fillers or additives. The fillers can be any fillers known to those skilled in the art, e.g., barium sulphate, calcium sulphate, calcium carbonate, silicas or silicates (such as talc, feldspar, and china clay). Additives such as aluminium oxide, silicon carbide, for instance carborundum, ceramic particles, glass particles, stabilisers, antioxidants, levelling agents, anti-settling agents, anti-static agents, matting agents, rheology modifiers, surface-active agents, amine synergists, waxes, or adhesion promoters can also be added. In general, the hot melt coating composition used in the process according to the present invention comprises 0 to 50 wt. % of fillers and/or additives, calculated on the total weight of the coating composition.

The radiation curable hot melt composition used in the process according to the present invention can also contain one or more pigments. In principle, all pigments known to those skilled in the art can be used. However, care should be taken that the pigment does not show a too high absorption of the radiation used to cure the composition. In general, the hot melt composition comprises 0 to 50 wt. % of pigment, preferably 10–30 wt. % of pigment, calculated on the total weight of the coating composition.

Because of the film on top of the coating that reduces the initiated radicals from being caught by oxygen in the air, acceptable curing of a pigmented coating can be reached even when the coating comprises a relatively large amount of pigments.

In addition to the compounds mentioned above, the radiation curable hot melt composition used in the process according to the present invention can also comprise volatile organic compounds or reactive diluents, for example, to lower the viscosity of the composition. However, the amount of such compounds should be as low as possible. The composition can also contain up to 5 wt. % water, calculated on the total weight of the coating composition.

The amount of volatile organic compounds in the hot melt composition normally is below 450 g/l and may for instance be between 0 and 40 wt. %. Preferably, the hot melt composition comprises less than 15%, more preferably less than 10%, most preferably less than 5% volatile organic compounds calculated on the total weight of the coating composition. Highly preferred is a hot melt composition that does not contain volatile organic compounds.

The hot melt may contain reactive diluents, for instance in an amount of 0–50 wt. % and typically is 5–30 wt. %, calculated on the total weight of the coating composition. Preferably, the hot melt composition comprises less than 15%, more preferably less than 10%, most preferably less than 5% reactive diluent. Most preferred is a hot melt coating composition not containing any reactive diluents.

The process for the preparation of the radiation curable hot melt composition is not critical. The components can generally be added in any arbitrary sequence. Normally, the components are mixed until a homogeneous mixture is obtained. The mixing can be done in air. Care should be taken that during the mixing of the components the temperature does not become so high as to cause degradation of any of the components. Needless to say, the mixing should be performed in the absence of any radiation that could initiate curing of the coating.

Equipment known to those skilled in the art can be used to apply the hot melt coating, e.g. a roller coater, a spraygun or a curtain coater. Also suitable contact and non-contact printing techniques, as well as deposition coating techniques can be used to apply these compositions.

Before or during application of the hot melt coating to the substrate and/or to the film, the coating is heated to the application temperature. Equipment known to those skilled in the art can be used to heat and apply the coating, e.g. heated rollers, a heated spraygun or a heated curtain coater. It is also possible to heat the composition in a storage tank or vessel and/or to heat the composition in the hose that conveys it to an application apparatus and/or in the application apparatus itself. The generation of hot-spots should be avoided by using suitable agitation. Heating can be performed by using direct or indirect heating, e.g., by using infrared radiation.

After the hot melt coating composition is applied to the substrate and/or the film, it is optionally cooled and/or dried, either naturally or forced. This process can also be used to prepare a pre-coated film.

Next, the substrate and the film are pressed together in such a way that the coating is sandwiched between them. Alternatively, the whole process starts with pressing a pre-coated film and a substrate together in such a way that the coating is sandwiched between them. The surface of the coating sandwiched between the substrate and the film may conform to the surface configuration on the side of the film facing the coating layer. It is also possible to emboss a flexible film in order to impart a pattern to the coating. In a subsequent step, the coating sandwiched between the substrate and the film is cured by irradiation through the film, followed by removal of the film from the coated substrate.

One advantage of a hot melt composition is that it can be formulated in such a way that it emits substantially no volatiles during drying or curing. In that case, the drying step can be left out. Consequently, the hot melt compositions according to the present invention are also very suitable to be used in a process that operates at high speed.

In one embodiment, the hot melt coating is applied at elevated temperature and kept warm to allow flow out of the coating composition. Additionally or alternatively, the coating composition may be kept at elevated temperature to control the imparting of the surface configuration of the film to the coating.

In another embodiment, the hot melt coating composition is allowed to cool after application, or the coating sandwiched between the substrate and the film is allowed to cool. In a subsequent step, the film and/or the substrate are heated in order to soften the coating until it will flow again. This way the coating may level out. Preferably, a pressure is applied in order to force the softened coating to flow.

Because such a re-flow stage is feasible, the application of the coating on the film and/or the substrate is not critical. For instance, a hot melt composition can be applied on a substrate in such a way that the resulting coating layer has a rough surface. Next, a film can be put on top of the coating, followed by pressing the substrate and the film together using conventional hot pressing means, such as a pair of heated calender rolls. This way the coating layer will re-flow and a more uniform coating thickness is obtained.

If the hot melt composition is applied to a substrate in a film transfer process, it is possible to coat two opposite sides of the substrate at the same time. Two films are coated, optionally dried, and subsequently pressed onto two sides of the substrate. After curing of the two coating layers by irradiation through both films, the films are removed from the double-coated substrate.

If the hot melt composition is applied to one side of a substrate in a casting process, it is possible to coat the opposite side of the substrate by means of a film transfer process at the same time.

Preferably, the film used in the film transfer process is flexible. The flexible film may constitute a continuous and seamless loop or a reel of film, which can be used and retreated. In a continuous loop process or a reel process, part of the film is coated and the coating is given the time to revert back to its solid form, using chilling means such as chilled air or a chilled roller if necessary. Alternatively, use may be made of a pre-coated loop or reel of film, i.e. an off-line pre-coated film. However, the uncured hot-melt composition used to prepare such a pre-coated loop or reel of film preferably is non-tacky when cooled. This is generally not achieved.

Subsequently, the coated film is placed on a substrate. For instance, the coated film may be passed through a hot calender nip, where it makes contact with the substrate to be coated. The heat involved causes the coating to soften. The laminated substrate is then subjected to radiation, for instance UV or electron beam radiation, to cure the coating. Then the film is de-laminated from the coated substrate. Next, the film returns to be recoated in the continuous loop process, or the film is rewound and sent for recoating in the reel process. Alternatively, the film is left in place on the coated substrate to offer process protection until its removal is convenient or required.

In these film transfer processes, the substrate may be in the form of separate sheets or plates. Alternatively, the substrate may be a flexible film as well. In that case the substrate may be dereeled before entering the film transfer process and rereeled after being coated.

Preferably, the film used in the casting process is flexible. The flexible film may be a reel of film which can be used and retreated. For example, the film may be reeled off a roll onto the coated substrate. After curing of the coating, the film is removed from the coated substrate and may subsequently be rewound onto a roll. Next, the process can be repeated using the rereeled film.

In such a casting process, the substrate may be in the form of separate sheets or plates. Alternatively, the substrate itself may be a flexible film which can be dereeled before entering the casting transfer process and rereeled after being coated.

Using a process according to the present invention, it is possible to apply one or more coating layers of the hot melt composition to a substrate. The process is particularly useful for applying a top coat to an optionally coated substrate. In principle, there is no restriction as to the coating composition(s) that may have been applied to a substrate, as long as there is good adhesion between the coating on top of the substrate and the (cured) hot melt composition. The same type(s) of coating composition(s) can be used for the optional pre-coating layer(s) as for the top coat layer, although the composition of this (these) coating layer(s) and the top coating composition need not be the same. The pre-coating layer(s) can be applied to the substrate by conventional means, such as by curtain coater, spray nozzle, roller coater, or flow coater. Also suitable contact and non-contact printing techniques, as well as deposition coating techniques can be used to apply these compositions.

The hot melt coating composition used in the process according to the present invention cures to a coating with a very high abrasion resistance on the one hand and a very high flexibility on the other. The composition can be used as a primer, filler or top coat. To obtain optimum properties of the coated substrate with respect to abrasion resistance, stain resistance, flexibility, and adhesion, one or more coating layers are applied, each in an amount of 3 to 50 g/m$^2$.

If the substrate is parquet flooring, optimum results are found if the composition is applied in one or two layers as a base coat at 25 to 35 g/m$^2$, and as a top coat at 5 to 15 g/m$^2$.

If the substrate is furniture veneer, optimum results are found if the composition is applied in one or two layers as a base coat at 25 to 35 g/m$^2$, and as a top coat at 5 to 20 g/m$^2$.

If the substrate is PVC flooring, optimum results are found if the composition is applied in one layer at 5 to 50 g/m$^2$, preferably at 15 to 25 g/m$^2$. For PVC flooring it is also possible to add an additional layer.

The invention will be elucidated with reference to the following examples. These are intended to illustrate the invention but are not to be construed as limiting in any manner the scope thereof.

EXAMPLES

Several hot melt compositions were prepared according to the following formulations in which the percentages are weight percentages based on the total weight of the composition.

| Formulation 1 | |
|---|---|
| Tri-functional aliphatic urethane acrylate oligomer | <15% |
| Tetra-functional polyester acrylate | ≈40% |
| Bisphenol A epoxy acrylate | ≈25% |
| Flexible epoxy acrylate | ≈12% |
| Benzophenone | <1.5% |
| α-Hydroxy ketone | <1.5% |
| Di-functional acrylic monomer | <10% |
| Additives | <1.5% |
| Formulation 2 | |
| Bisphenol A epoxy acrylate | ≈97% |
| Benzophenone | <1.5% |
| α-Hydroxy ketone | <1.5% |
| Additives | <1% |
| Formulation 3 | |
| Bisphenol A epoxy acrylate | ≈77% |

-continued

| | |
|---|---|
| Cellulose acetate butyrate | ≈20% |
| Benzophenone | <0.7% |
| α-Hydroxy ketone | <0.7% |
| Additives | <0.5% |
| Formulation 4 | |
| Tetra-functional polyester acrylate | ≈49% |
| Bisphenol A epoxy acrylate | ≈28% |
| Flexible epoxy acrylate | ≈15% |
| Benzophenone | ≈1.5% |
| α-Hydroxy ketone | ≈1.5% |
| Di-functional acrylate monomer | <7% |
| Additives | <1% |
| Formulation 5 | |
| Tri-functional aliphatic urethane acrylate oligomer | ≈80% |
| Di-functional aromatic urethane acrylate | ≈20% |
| Oligomeric hydroxy ketone | <1% |
| Formulation 6 | |
| Tetra-functional polyester acrylate | 95.9% |
| alpha-amino ketone photoinitiator | 4.0% |
| Slip and flow additive | 0.1% |
| Formulation 7 | |
| Tetra-functional polyester acrylate | 88.5% |
| Tri-functional aliphatic urethane acrylate oligomer | 9.72% |
| Slip and flow additive | 0.78% |
| BAPO photoinitiator | 1.0% |

Several compositions according to Formulations 1 to 7 were prepared having a viscosity of 800–3,000 mPa·s at 70° C. These hot melt compositions were applied to substrates by means of a casting process or a film transfer process. The compositions were applied to a substrate and/or to a film at a temperature between 60 and 80° C. Each coating composition sandwiched between a substrate and a film was cured through the radiation permeable film using UV radiation. Medium-pressure 120 W/cm mercury lamps were used to irradiate the substrates coated with compositions according to Formulations 1 to 5. Low energy UV lamps emitting radiation having a wavelength between 300 and 500 nm, and showing a maximum in the UV emission band at around 350 nm, were used to irradiate the substrates coated with compositions according to Formulations 6 and 7.

After removal of the film, the properties of the cured coating layers on top of the substrates were tested. The test results for the samples prepared using compositions according to Formulations 1 to 7 are summarised in Table 1.

TABLE 1

| | |
|---|---|
| Stain resistance | Superior |
| Scuff and scratch resistance | Superior |
| Solvent resistance | Superior |
| Photo yellowing | Low |

It proved to be possible to adjust the flexibility of the coatings such that it suited the flexibility of the substrate.

Compositions according to Formulation 1 proved to be particular suitable to be used for coating a variety of substrates such as paper, furniture foils, flooring, and furniture.

Compositions according to Formulation 2, 3 and 4 proved to be particularly suitable to be used for coating paper substrates. Compositions according to Formulation 3 proved to be less tacky when cooled than compositions according to Formulation 2, which is better for the process.

Compositions according to Formulation 5 proved to be particularly suitable to be used for coating flexible flooring.

Compositions according to Formulation 6 proved to be particularly suitable to be used for paper, furniture, furniture foils, flooring (wood and polymeric).

Compositions according to Formulation 7 proved to be particularly suitable to be used for furniture, furniture foils, flooring (wood and polymeric).

What is claimed is:

1. A process for coating a substrate comprising a first step of applying a radiation curable coating composition to the substrate and/or to a radiation permeable film, the coating composition being a hot melt composition comprising 20 to 100 wt. % of a radiation curable resin or mixture of radiation curable resins having a viscosity in the range of from 15 to 10,000 mPa.s in the temperature range of from 40 to 150° C.; next pressing the substrate and the film together to sandwich the coating composition between them; thereafter curing the coating composition by irradiation through the film to obtain a coated substrate; and in a subsequent step removing the film from the coated substrate.

2. The process according to claim 1, further comprising:
a) 0 to 50 wt. % of non-radiation curable polymers,
b) 0 to 10 wt. % of a photoinitiator,
c) 0 to 50 wt. % of fillers and/or additives,
d) 0 to 40 wt. % of volatile organic compounds,
e) 0 to 50 wt. % of reactive diluents, and
f) 0 to 50 wt. % of pigment,
wherein the total amount of components a) to f) and the 20 to 100 wt. % of a radiation curable resin or mixture of radiation curable resins amounts to 100 wt. %.

3. The process according to claim 1, wherein the coating composition is a hot melt composition comprising a radiation curable resin or mixture of radiation curable resins having a viscosity in the range of from 15 to 4,000 mPa.s in the temperature range of from 40 to 150° C.

4. The process according to claim 1, wherein the coating composition comprises a polyester acrylate resin.

5. The process according to claim 4, wherein the coating composition comprises at least 40 wt. % of the polyester acrylate resin.

6. The process according to claim 1, wherein the substrate is a heat-sensitive substrate.

7. The process according to claim 6, wherein the substrate contains cellulose and/or plastic.

8. The process according to claim 1, further comprising allowing the uncured coating composition on the film, or on the substrate, or sandwiched between the substrate and the film, to re-flow by heating the substrate and/or the film such that the coating softens.

9. The process according to claim 8, wherein re-flow is achieved by heating and applying pressure.

10. The process according to claim 1, wherein the curing by irradiation is performed using a low energy UV source or a medium-pressure mercury lamp.

11. The process according to claim 1, wherein the step of pressing the substrate and the film together to sandwich the coating composition between them occurs without drying the coating composition.

12. The process according to claim 1, wherein the coating is applied in an amount of 3–50 g/m$^2$.

* * * * *